United States Patent [19]
Lee et al.

[11] Patent Number: 6,077,054
[45] Date of Patent: Jun. 20, 2000

[54] STATOR OF LINEAR COMPRESSOR

[75] Inventors: Sung-Jae Lee, Anyang; Phil-Soo Jang, Suwon, both of Rep. of Korea

[73] Assignee: Samsung Electronics Co., Ltd., Suwon, Rep. of Korea

[21] Appl. No.: 09/206,963

[22] Filed: Dec. 8, 1998

[30] Foreign Application Priority Data

Dec. 23, 1997 [KR] Rep. of Korea ................. 97-40064 U
May 8, 1998 [KR] Rep. of Korea ..................... P98-16520

[51] Int. Cl.[7] .................................................. F04B 17/04
[52] U.S. Cl. ........................................... 417/417; 310/15
[58] Field of Search .............................. 417/417; 310/15, 310/30; 335/219

[56] References Cited

U.S. PATENT DOCUMENTS 2,872,101  2/1959  Ryba ................................. 417/417 X

FOREIGN PATENT DOCUMENTS 56-156379  12/1981  Japan .
9-195928    7/1997  Japan .
848889      9/1960  United Kingdom ................... 417/417

*Primary Examiner*—Tony M. Argenbright
*Attorney, Agent, or Firm*—Burns, Doane, Swecker & Mathis, L.L.P.

[57] ABSTRACT

There is disclosed a stator of a linear compressor which comprises a bobbin of a cylindrical shape having a recess for winding coils at the outer circumference thereof, coils wound in the coil winding recess, and a plurality of cores inserted into the bobbin. A plurality of guide rails extending to the axial direction of the bobbin are arranged radially at regular intervals on the inner circumference of the bobbin and the cores are mounted between the respective guide rails. Further, a plurality of guide projections extending outward from the outer circumferences of the upper and lower ends of the bobbin are arranged at regular intervals. In addition, there are further provided a plurality of supporting jaws extending toward the inside of the bobbin between the respective guide rails.

3 Claims, 8 Drawing Sheets

(a)

(b)

(a)

(b)

(a)

(b)

(a)

(b)

(a)

(b)

STATOR OF LINEAR COMPRESSOR

BACKGROUND OF THE INVENTION

(1) Field of the Invention

This invention relates to a linear compressor, and more particularly, to a stator of a linear compressor in which upper-lower splited type cores are regurally arranged in a bobbin in such a manner that their inner surfaces form a real circle.

(2) Description of the Prior Art

In general, a linear compressor is used in a refrigeration system that provides refrigeration energy by undergoing a refrigerant the successive process of compressing, condensing, expanding and evaporating. The linear compressor has a linear motor, which is driven by electromagnetic force created by the alternate direction change of magnetic flux, to compress the refrigerant at high temperature and pressure.

FIG. 1 shows a cross-sectional view of a conventional linear compressor. As shown in the figure, the conventional linear compressor consists of a housing 10, a driving part generating a driving force in the housing 10, and a compressing part inhaling, compressing and discharging a refrigerant by using the driving force of the driving part.

The compressing part includes a piston 11 and a cylinder block 13 which has a compressing chamber 12 for accommodating the piston 11 that moves rectilinearly and reciprocally therein. On one end of the cylinder block 13 is mounted a cylinder head 16 in which an inhaling chamber 14 and a discharging chamber 15 are provided for guiding the refrigerant to the inside and outside of the compressing chamber 12, respectively.

The driving part includes a back iron 20 attached to the outer circumference of the cylinder block 13, a stator 30 disposed apart from the back iron 20 at a given interval, and a permanent magnet 21 disposed between the back iron 20 and the stator 30 to interact with the electric field created by the stator 30. The stator 30 includes a bobbin 31 of a cylindrical shape having grooves for winding coils at the outer circumference thereof, coils 32 wound in the coil winding grooves of the bobbin 31, a plurality of cores 33 inserted into the bobbin 31 on which the coils 32 are wound.

On one end of the piston 11 is provided a fixing shaft 11a with a frame 40 for fixing the permanent magnet 21. A resonant spring 41 for elastically supporting the piston 11 is connected to one end of the fixing shaft 11a to raise the compressing force of the piston 11.

In such a conventional linear compressor, the cores 33 are arranged radially along the outer circumference of the cylindrical bobbin 31. However, it is very difficult to arrange the cores 33, which are made by piling up electric steel plates, at the bobbin 31 regularly in such a manner that the inner surfaces of the cores 33 form a real circle. The cores 33 and a permanent magnet 21 are spaced out at a fine interval from each other. Accordingly, If the cores 33 are arranged irregularly so that their inner surfaces do not form a real circle, the interval between the cores 33 and the permanent magnet 21 can not be kept constant so that the performance of the compressor is lowered, and the damage of the parts may be caused by the friction between the cores 33 and the permanent magnet 21.

On the other hand, in order to solve the above problems, there is disclosed a stator of a linear compressor in the Korean Patent Laid Open No. 97-55136 as shown in FIGS. 2a and 2b. As shown in the figures, the bobbin 31 of a cylindrical shape has grooves for winding the coils at its outer circumference. On the upper and lower ends of the bobbin 31 are radially arranged a plurality of guide projections 34 at regular intervals, between which the cores 34 are mounted. The cores 33 are made by piling up electric steel plates of a $\Omega$-shape.

Therefore, the cores 33 are guided by the guide projections 34 and arranged regularly at the bobbin 31 in the state that their inner surfaces form a real circle, so that the interval between the cores 33 and the permanent magnet 21 can be kept constant.

However, in such a conventional art, to mount the cores of the $\Omega$-shape on the bobbin having the aforementioned shape is carried out satisfactorily, but it is not in the cores of a C-shape. That is, the size of the permanent magnet is decided in proportion to the longitudinal length of the cores, and the core of the $\Omega$-shape has a larger longitudinal length than the core of the C-shape when the same size of the bobbin is used. As a result, a larger-sized permanent magnet is also used, so that the entire weight of the compressor and its manufacturing cost are relatively increased.

Because of this reason, it is advantageous that the C-shaped core which is able to be split into the upper and lower parts is adopted, compared with the $\Omega$-shaped core. But, it is difficult to support the upper core and the lower core in such a manner that the cores' inner surfaces form a real circle by means of the shape of the bobbin that has the guide projections only at the upper and lower plates. In addition, it may be caused that the contact portions between the upper core and the lower core are not fitted exactly to each other, so that the interval between the cores and the permanent magnet is not kept constant.

SUMMARY OF THE INVENTION

This invention has been made in an effort to solve the above problems. It is an object of this invention to provide a stator of a linear compressor in which the spape of a bobbin is improved so that the C-shaped cores of the upper-lower split type are regularly arranged therein in such a manner that the cores' inner surfaces form a real circle.

To achieve the above object, a stator of a linear compressor according to this invention includes a bobbin of a cylindrical shape having a recess for winding coils at the outer circumference thereof, coils wound in the coil winding recess of the bobbin, a plurality of cores inserted into the bobbin on which the coils are wound, wherein a plurality of guide rails extending to the axial direction of the bobbin are arranged radially at regular intervals on the inner circumference of the bobbin, and the cores are mounted between the respective guide rails.

As one aspect of this invention, a plurality of guide projections extending outward from the outer circumferences of the upper and lower ends of the bobbin are further arranged at regular intervals, and the cores are mounted between the respective guide projections.

As another aspect of this invention, there are further provided a plurality of supporting jaws extending toward the inside of the bobbin between the respective guide rails, the upper and lower ends of which support the ends of the cores.

BRIEF DESCRIPTION OF THE DRAWINGS

Further objects and other advantages of this invention will become apparent from the following description in conjunction with the attached drawings, in which:

FIG. 2a is a plan view of a conventional stator of a linear compressor;

FIG. 2b is a cross-sectional view taken along line II—II in FIG. 2a;

FIG. 5a is a perspective view of a bobbin of the stator according to a first preferred embodiment of this invention;

FIG. 5b is a cross-sectional view taken along line V—V in FIG. 5a;

FIG. 6a is a perspective view of a bobbin of the stator according to a second preferred embodiment of this invention;

FIG. 6b is a cross-sectional view taken along line VI—VI in FIG. 6a;

FIG. 7a is a perspective view of a bobbin of the stator according to a third preferred embodiment of this invention;

FIG. 7b is a cross-sectional view taken along line VII—VII in FIG. 7a;

FIG. 8a is a perspective view of a bobbin of the stator according to a fourth preferred embodiment of this invention; and FIG. 8b is a cross-sectional view taken along line VIII—VIII in FIG. 8a.

DETAILED DESCRIPTION OF THE PREFERRED EMBODIMENTS

Preferred embodiments of this invention will now be described in detail with reference to the accompanying drawings.

Figure 1:
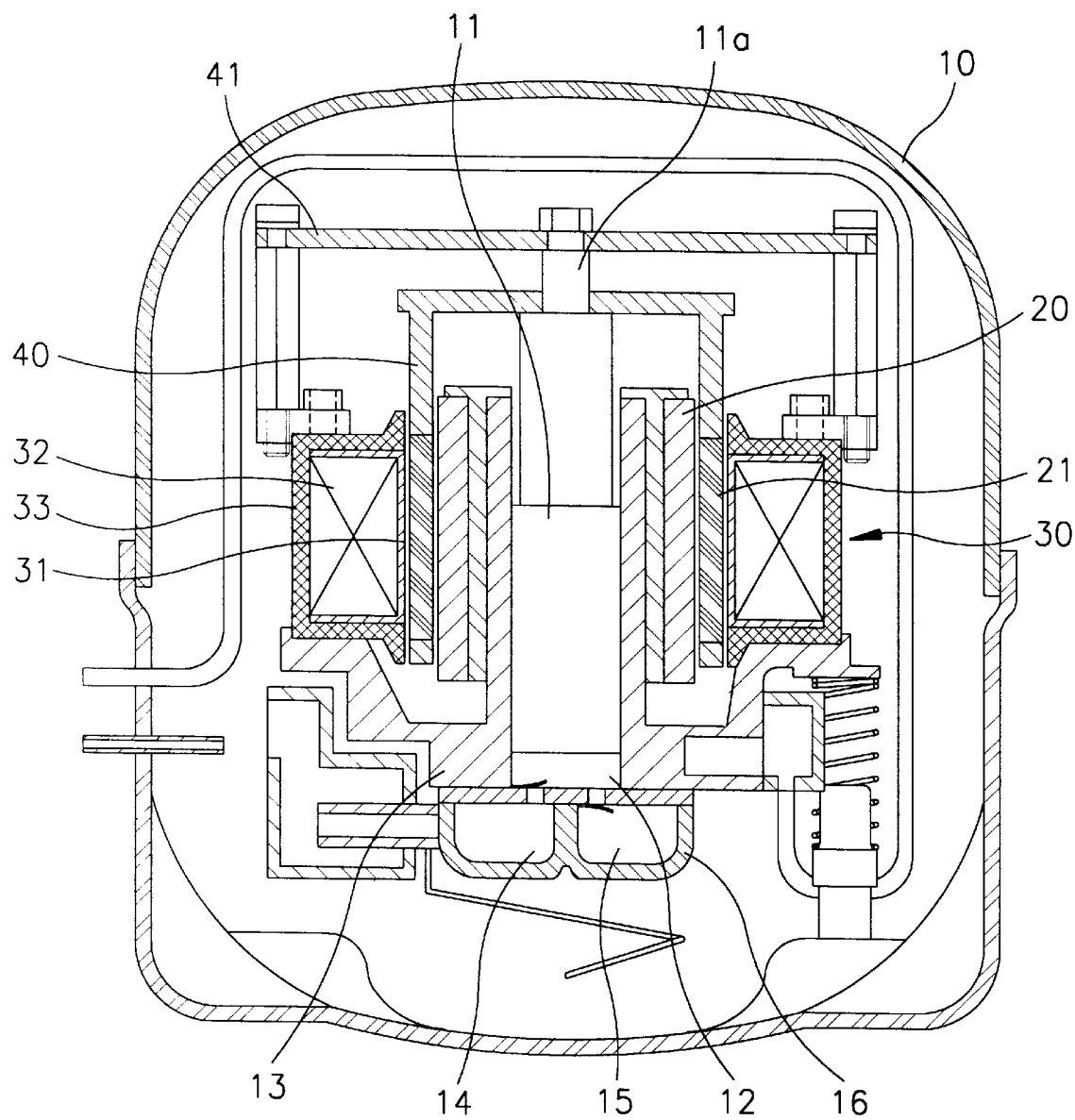
FIG. 1 is a cross-sectional view of a conventional linear compressor.
Figure 2:
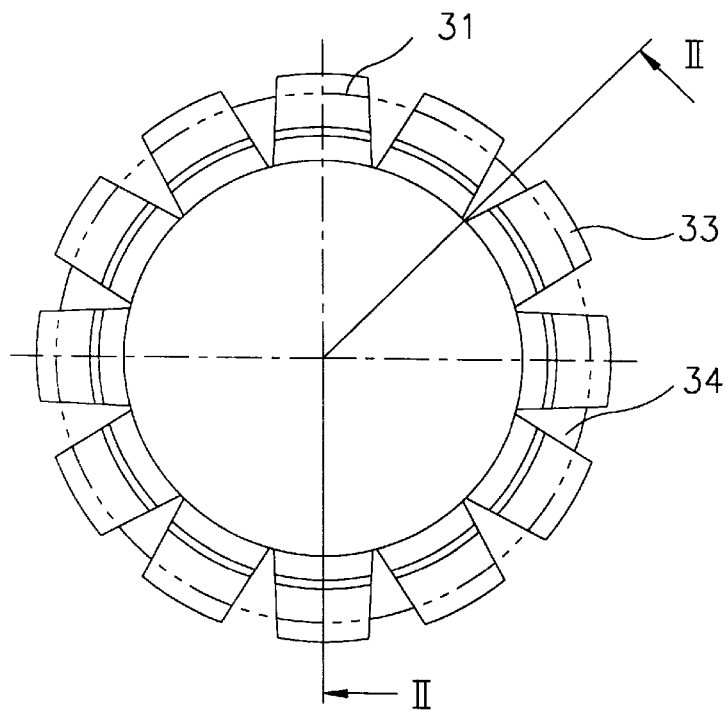
Figure 2:
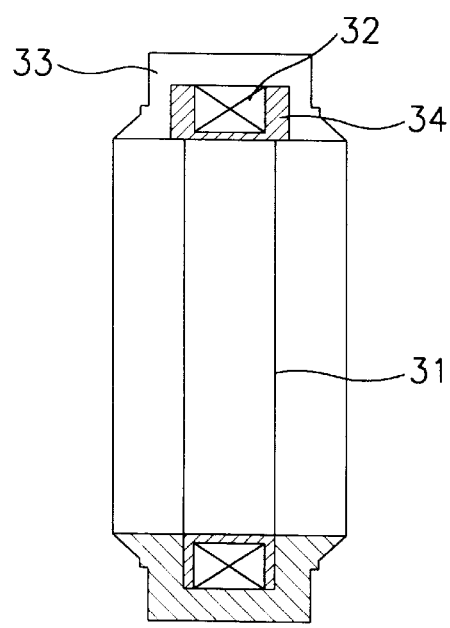
Figure 3:
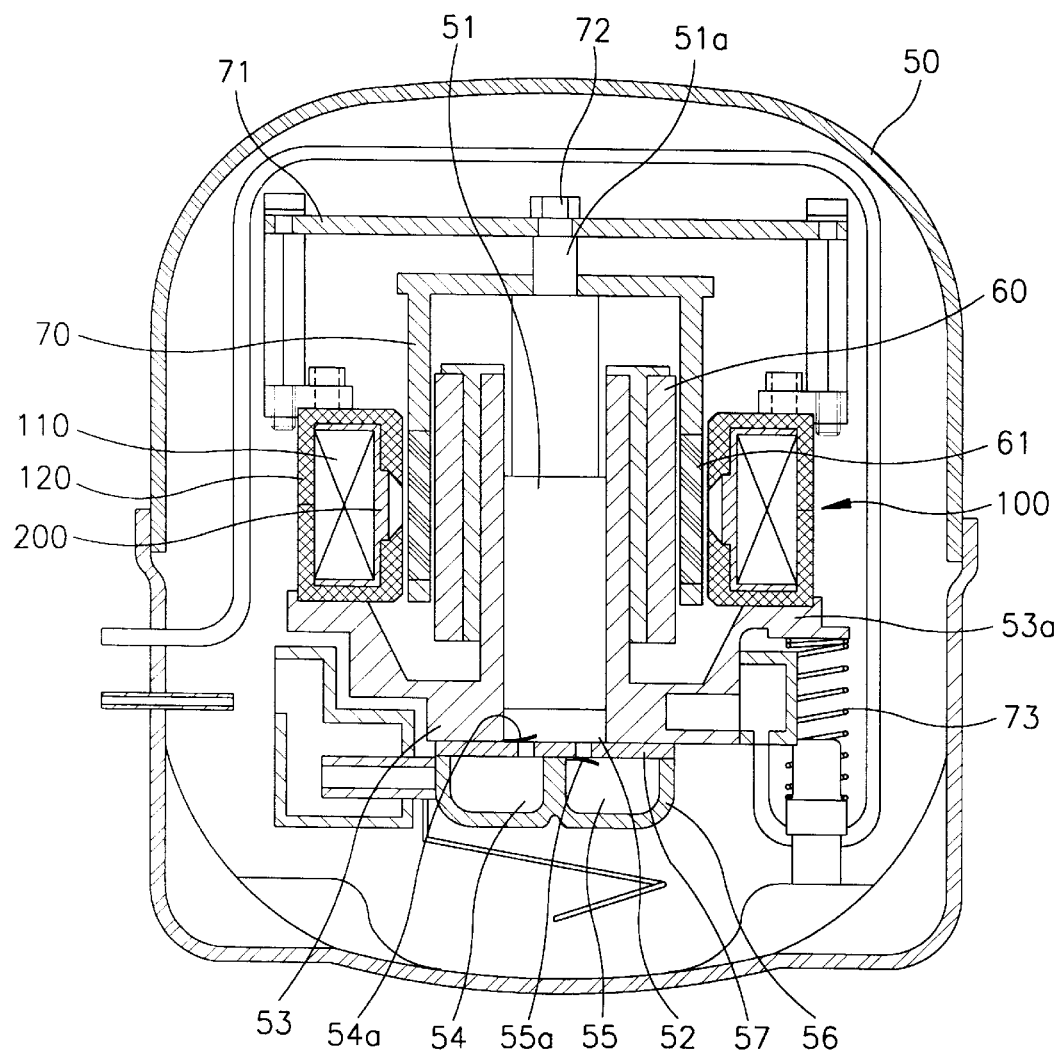
FIG. 3 is a cross-sectional view of a linear compressor according to this invention.

As shown in FIG. 3, a linear compressor according to this invention consists of a housing 50 defining an external appearance, a driving part generating a driving force in the housing 50, and a compressing part inhaling, compressing and discharging a refrigerant by using the driving force of the driving part.

The compressing part includes a piston 51 and a cylinder block 53 which has a compressing chamber 52 for accommodating the piston 51 that moves rectilinearly and reciprocally therein. On one end of the cylinder block 53 is mounted a cylinder head 56 in which an inhaling chamber 54 and a discharging chamber 55 are provided for guiding the refrigerant to the inside and outside of the compressing chamber 52, respectively. Inhaling valve 54a and discharging valve 55a are mounted between the cylinder block 53 and the cylinder head 56 to open and close the inhaling chamber 54 and the discharging chamber 55, respectively.

The driving part includes a back iron 60 attached to the outer circumference of the cylinder block 53, a stator 100 disposed apart from the back iron 60 at a given interval, and a permanent magnet 61 disposed between the back iron 60 and the stator 100 to interact with the electric field created by the stator 100.

Figure 4:
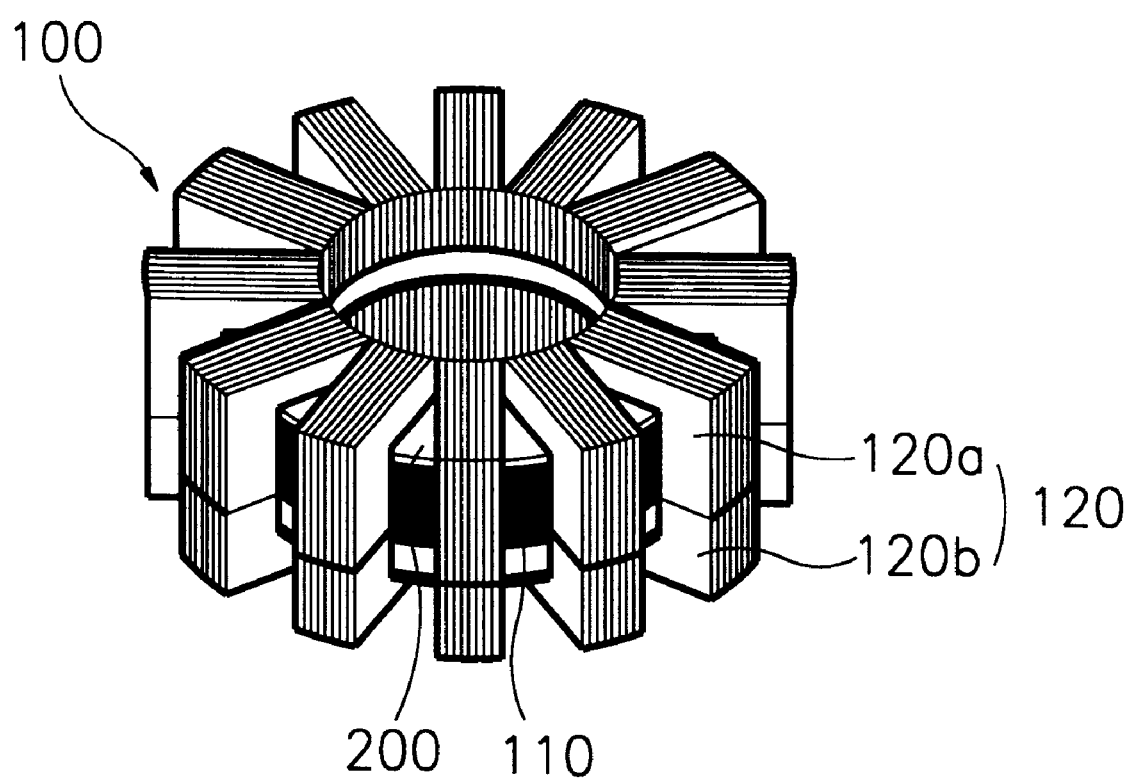
FIG. 4 is a perspective view of a stator of the linear compressor according to this invention.

As shown in FIG. 4, the stator 100 includes a bobbin 200 of a cylindrical shape having a recess for winding coils at the outer circumference thereof, coils 110 wound in the coil winding recess of the bobbin 200, a plurality of cores 120 inserted into the bobbin 200 on which the coils 110 are wound. It is desirable that the bobbin 200 is of a electrical insulating material, and a plastic moulding is used in this invention. The respective core 120 is made by piling up a plurality of electric steel plates, which has a C-shape and is divided into an upper core 120a and a lower core 120b.

On one end of the piston 51 is provided a fixing shaft 51a with a frame 70 for fixing the permanent magnet 61. A resonant spring 71 for elastically supporting the piston 51 is connected to one end of the fixing shaft 51a by means of a bolt 72 to raise the compressing force of the piston 51.

A supporting member 53a is provided at the cyliner block 53 to support the stator 100, under which a supporting spring 73 is mounted to support the cylinder block 53 entirely.

Figure 5:
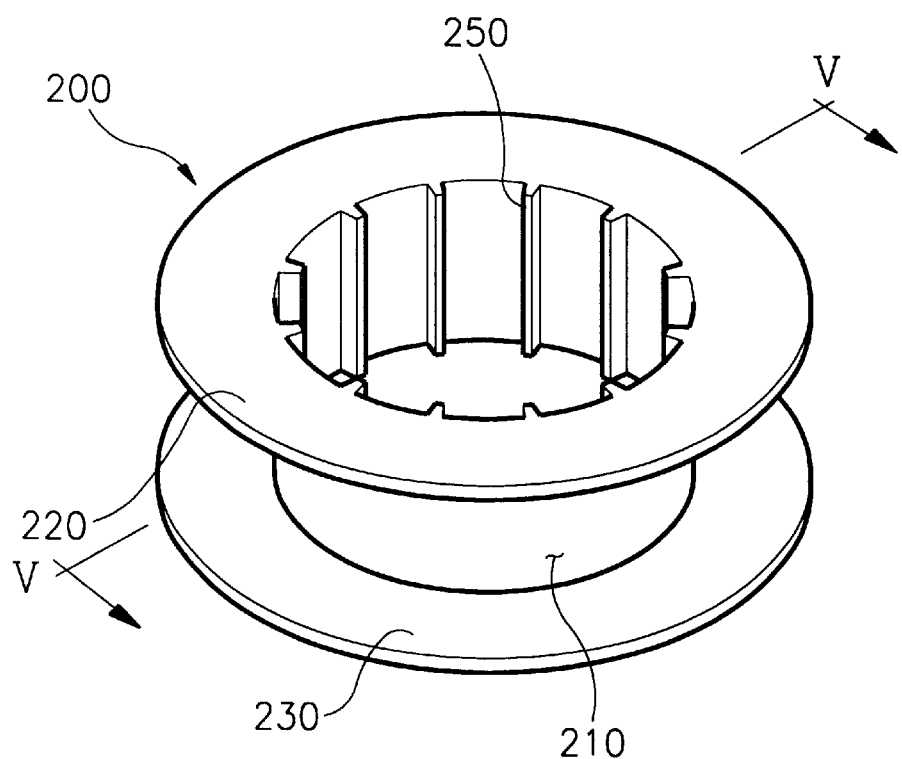
Figure 5:
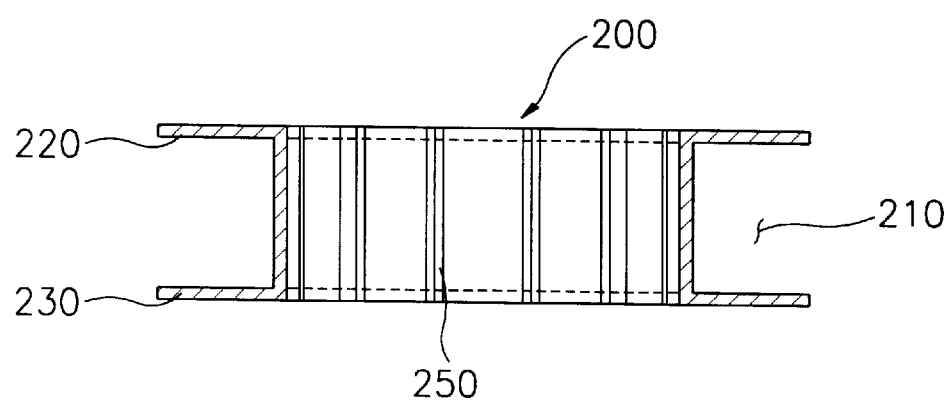

FIG. 5a is a perspective view of a bobbin of the stator according to a first preferred embodiment of this invention and FIG. 5b is a cross-sectional view taken along line V—V in FIG. 5a. As shown in the figures, the bobbin 200 is of a hollow cylindrical shape having a recess 210 for winding the coils 110 at its outer circumference, and includes an upper plate 220 and a lower plate 230 extending outward horizontally therefrom. The bobbin 200 further includes a plurality of guide rails 250 extending in the axial direction of the bobbin 200 from the inner circumference of the bobbin 200 to mount the cores 120 therein. The guide rails 250 are arranged radially over the entire inner circumference of the bobbin 200 at regular intervals.

Thus, the assembly of the stator 100 is completed by seating the respective upper core 120a between the respective guide rails 250 after winding the coils 110 in the coil winding recess 210, and then seating the respective lower core 120b between the respective guide rails 250. Because the upper and lower cores 120a and 120b are securely supported by the guide rails 250 formed at the inner circumference of the bobbin 200, they can be arranged in such a manner that their inner surfaces form a real circle and the contacting portions of the upper and lower cores 120a and 120b are fitted exactly.

Figure 6:
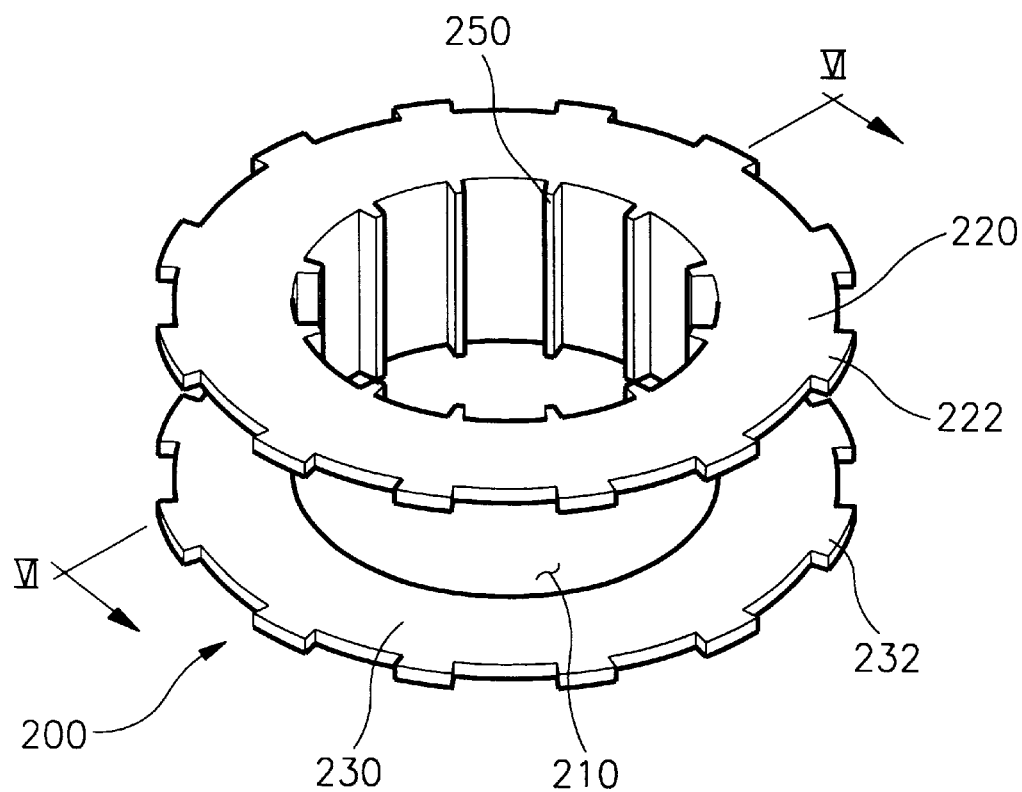
Figure 6:
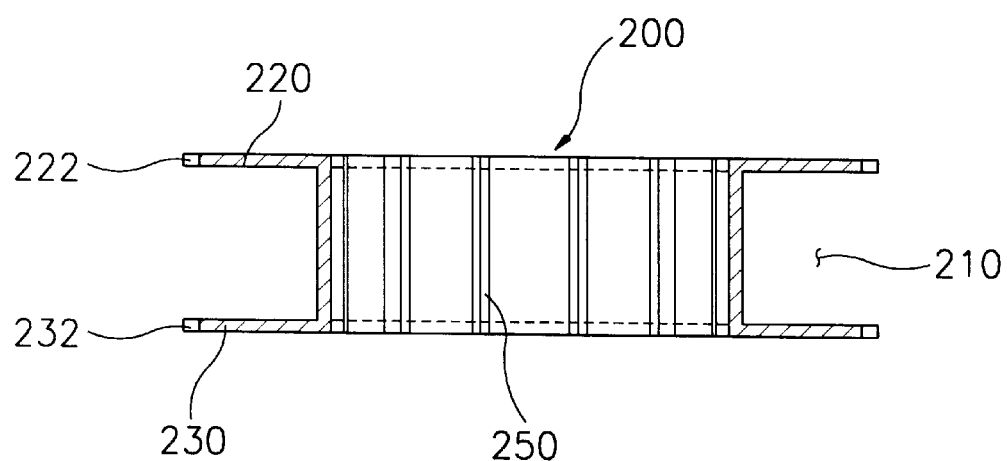

FIG. 6a is a perspective view of a bobbin of the stator according to a second preferred embodiment of this invention and FIG. 6b is a cross-sectional view taken along line VI—VI in FIG. 6a. As shown in the figures, the bobbin 200 is of a hollow cylindrical shape having a recess 210 for winding the coils 110 at its outer circumference, and includes an upper plate 220 and a lower plate 230 extending outward horizontally therefrom, as in the first embodiment. The bobbin 200 further includes a plurality of guide projections 222 and 232 and guide rails 250 for mounting the cores 120, which are provided at the upper and lower plates 220 and 230 and the inner circumference of the bobbin 200, respectively.

The guide projections 222 and 232 extend outward from the upper and lower plates 220 and 230 of the bobbin 200, respectively, and are arranged at regular intervals along the upper and lower plates 220 and 230. The guide rails 250 are arranged radially over the entire inner circumference of the bobbin 200 at regular intervals.

Thus, the assembly of the stator 100 is completed by seating the respective upper core 120a between the respective guide projections 222 and guide rails 250 after winding the coils 110 in the coil winding recess 210, and then seating the respective lower core 120b between the respective guide projections 232 and guide rails 250. Because both the inside and outside of the upper and lower cores 120a and 120b are securely supported by the guide projections 222,232 and the guide rails 250, they can be arranged in such a manner that their inner surfaces form a real circle and the contacting portions of the upper and lower cores 120a and 120b are fitted exactly.

Figure 7:
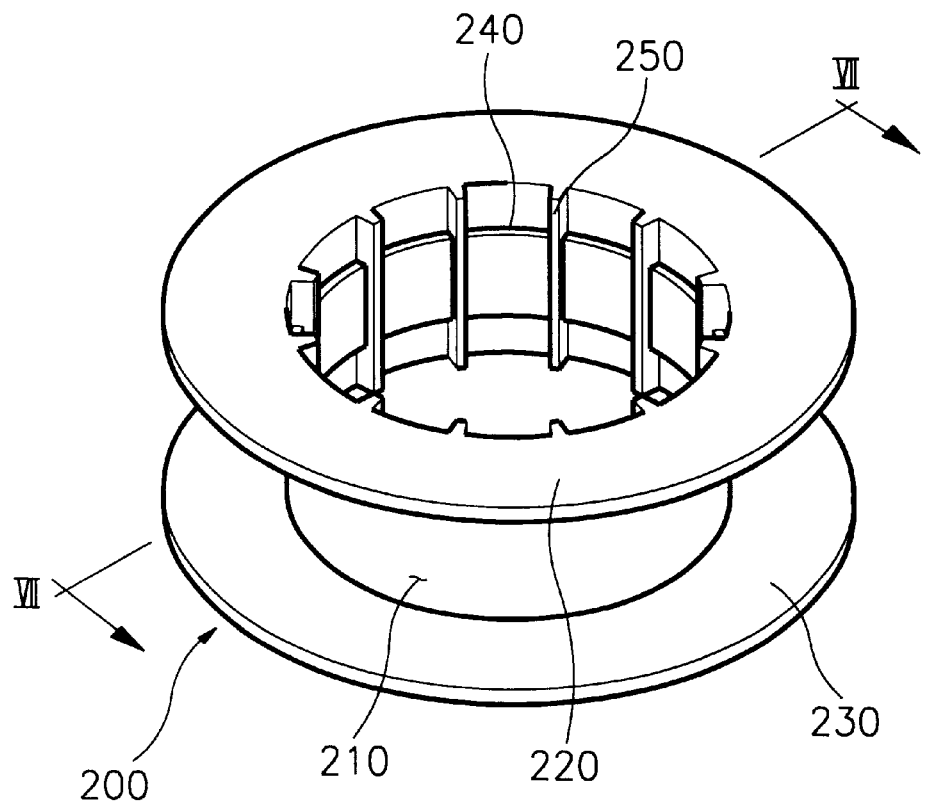
Figure 7:
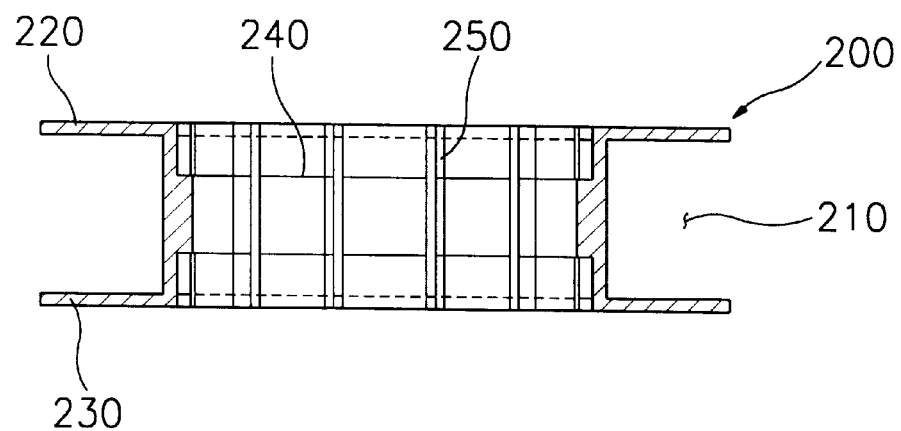

FIG. 7a is a perspective view of a bobbin of the stator according to a third preferred embodiment of this invention and FIG. 7b is a cross-sectional view taken along line VII—VII in FIG. 7a. A is shown in the figures, the bobbin 200 is of a hollow cylindrical shape having a recess 210 for winding the coils 110 at its outer circumference, and includes an upper plate 220 and a lower plate 230 extending outward horizontally therefrom, as in the first and second embodiments. The bobbin 200 further includes a plurality of guide rails 250 and supporting jaws 240 of a given width for mounting the cores 120, which are provided at the inner circumference of the bobbin 200.

The guide rails 250 are arranged radially over the entire inner circumference of the bobbin 200 at regular intervals. The supporting jaws 240 extend radially from the inner circumference of the bobbin 200 to have a circle band-shape and are arranged between the respective guide rails 250 in order that the upper and lower ends of the respective supporting jaws 240 support the ends of the upper core 120a and the lower core 120b, respectively.

Thus, the assembly of the stator 100 is completed by seating the respective upper core 120a between the respective guide rails 250 so as for the end of the upper core 120a to contact the upper end of the supporting jaw 240 after winding the coils 110 in the coil winding recess 210, and then seating the respective lower core 120b between the respective guide rails 250 so as for the end of the lower core 120b to contact the lower end of the supporting jaw 240. Because both the side and end surfaces of the upper and lower cores 120a and 120b are securely supported by the guide rails 250 and the supporting jaws 240, they can be arranged in such a manner that their inner surfaces form a real circle and the contacting portions of the upper and lower cores 120a and 120b are fitted exactly.

Figure 8:
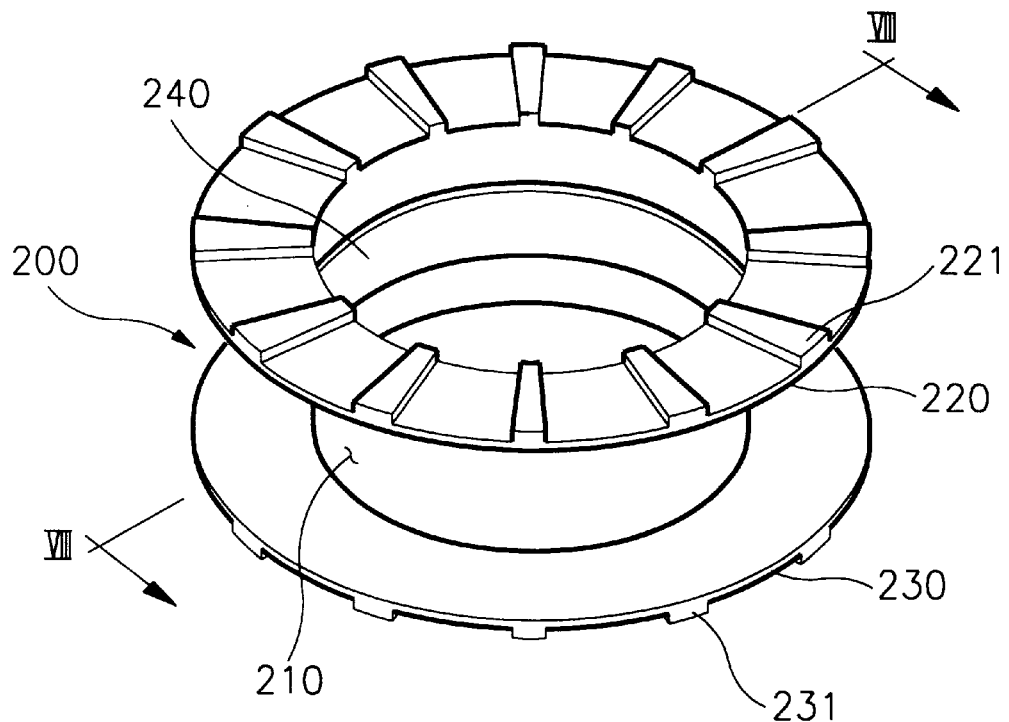
Figure 8:
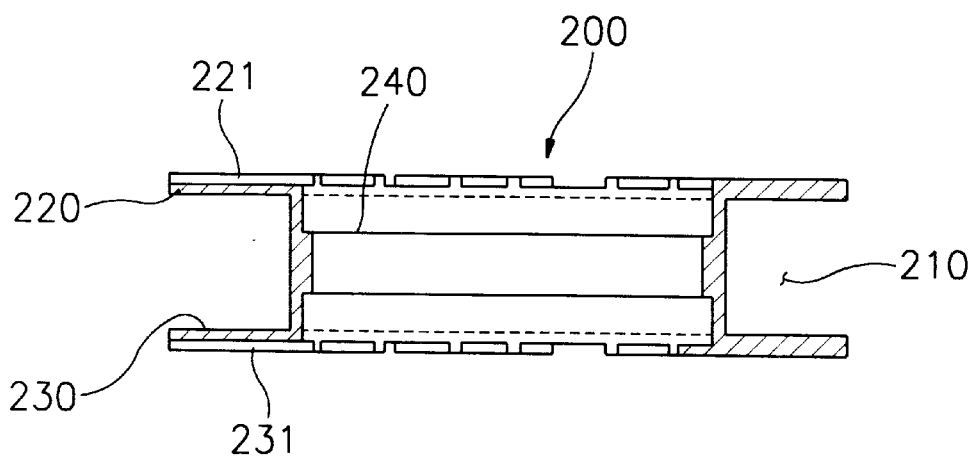

FIG. 8a is a perspective view of a bobbin of the stator according to a fourth preferred embodiment of this invention and FIG. 8b is a cross-sectional view taken along line VIII—VIII in FIG. 8a. As shown in the figures, the bobbin 200 is of a hollow cylindrical shape having a recess 210 for winding the coils 110 at its outer circumference, and includes an upper plate 220 and a lower plate 230 extending outward horizontally therefrom, as in the aforementioned embodiments. The bobbin 200 further includes a plurality of guide projections 221, 231 and supporting jaws 240 of a given width for mounting the cores 120, which are provided at the upper and lower plates 220, 230 and the inner circumference of the bobbin 200, respectively.

The guide projections 221 and 231 are arranged radially over the entire upper and lower plates 220 and 230 of the bobbin 200 at regular intervals, respectively. The supporting jaws 240 extend radially from the inner circumference of the bobbin 200 to have a circle band-shape in order that the upper and lower ends of the respective supporting jaws 240 support the ends of the upper core 120a and the lower core 120b, respectively.

Thus, the assembly of the stator 100 is completed by seating the respective upper core 120a between the respective guide projections 221 so as for the end of the upper core 120a to contact the upper end of the supporting jaw 240 after winding the coils 110 in the coil winding recess 210, and then seating the respective lower core 120b between the respective projections 231 so as for the end of the lower core 120b to contact the lower end of the supporting jaw 240. Because both the side and end surfaces of the upper and lower cores 120a and 120b are securely supported by the guide projections 221, 231 and the supporting jaws 240, they can be arranged in such a manner that their inner surfaces form a real circle and the contacting portions of the upper and lower cores 120a and 120b are fitted exactly.

In the operation of the linear compressor constructed as aforementioned, if an alternating current power is applied to the coils 110 of the stator 100, the piston 51 is moved rectilinearly and reciprocally by the interaction of the magnetic flux created between the stator 100 and the back iron 60 and the magnetic field of the permanent magnet 61 between the stator 100 and the back iron 60. By the reciprocal movement of the piston 51, the refrigerant continues to be inhaled into the compressing chamber 52 in the cylinder block 53 through the inhaling chamber 54 and compressed therein, and then discharged to the discharging chamber 55.

As described above, the linear compressor according to this invention has advantages in that because the C-shaped cores of an upper-lower splited type are adopted, the entire weight of the compressor and its manufacturing cost are reduced.

Further, the linear compressor according to this invention has advantages in that because the shape of the bobbin is further improved such that the C-shaped cores can be arranged in such a manner that their inner surfaces form a real circle and the contacting portions of the upper and lower cores are fitted exactly, the space between the cores and the permanent magnet can be kept constant so that not only the performance of the compressor is improved, but also any friction and collision between the cores and the permanent magnet due to a poor assembly are prevented so that the reliability of the compressor is increased.

What is claimed is:

1. A stator of a linear compressor comprising: a bobbin of a cylindrical shape having a recess for winding coils at the outer circumference thereof; coils wound in the coil winding recess of the bobbin; and a plurality of cores inserted into the bobbin on which the coils are wound, wherein a plurality of guide rails extending to the axial direction of the bobbin are arranged radially at regular intervals on the inner circumference of the bobbin, and the cores are mounted between the respective guide rails.

2. The stator of a linear compressor according to claim 1, wherein a plurality of guide projections extending outward from the outer circumferences of the upper and lower ends of the bobbin are further arranged at regular intervals, and the cores are mounted between the respective guide projections.

3. The stator of a linear compressor according to claim 1 or 2, wherein there are further provided a plurality of supporting jaws extending toward the inside of the bobbin between the respective guide rails, the upper and lower ends of which support the ends of the cores.

* * * * *